United States Patent [19]
Ogawa et al.

[11] Patent Number: 4,535,003
[45] Date of Patent: Aug. 13, 1985

[54] SURFACE MODIFYING COMPOSITIONS FOR VULCANIZED RUBBER AND METHOD OF MODIFYING VULCANIZED RUBBER SURFACE USING THE SAME

[75] Inventors: Masaki Ogawa, Kodaira; Yasuro Shiomura, Higashimurayama, both of Japan

[73] Assignee: Bridgestone Tire Co., Ltd., Tokyo, Japan

[21] Appl. No.: 577,907

[22] Filed: Feb. 7, 1984

[30] Foreign Application Priority Data

Apr. 4, 1983 [JP] Japan ................... 58-57917

[51] Int. Cl.$^3$ .................. B05D 5/10; C08L 91/06
[52] U.S. Cl. ................... 427/207.1; 106/272; 427/393.5
[58] Field of Search ............ 427/207.1, 385.5, 393.5; 106/36, 272

[56] References Cited

U.S. PATENT DOCUMENTS 2,124,288  7/1938  Dodd .................... 106/272

OTHER PUBLICATIONS

Derwent Publications–Abstract 38829x/21, 06/04/76, "Vulcanized Rubber Surface Treatment–With N,N Dihalosulphonamide Cpd. to Impart Good Adhesion Property".

Primary Examiner—Theodore Morris
Attorney, Agent, or Firm—Sughrue, Mion, Zinn, Macpeak & Seas

[57] ABSTRACT

A surface modifying composition for vulcanized rubber comprises a halogen-releasable halogenoid and a waxy substance having a melting point of not more than 100° C. and an inorganic filler, and is non-solvent type. The weight of the inorganic filler is in a range of 15–80% based on the whole surface modifying composition, and 0.6–20 times that of the halogen-releasable halogenoid. In the surface modification of vulcanized rubber, the surface coated with the surface modifying composition is heated at 60°–150° C.

14 Claims, No Drawings

SURFACE MODIFYING COMPOSITIONS FOR VULCANIZED RUBBER AND METHOD OF MODIFYING VULCANIZED RUBBER SURFACE USING THE SAME

BACKGROUND OF THE INVENTION (1) Field of the Invention

The present invention relates to a surface modifying composition for vulcanized rubber and a method of modifying a surface of vulcanized rubber. More particularly, the invention relates to a non-solvent type surface modifying composition for vulcanized rubber in which a halogen-releasable halogenoid and an inorganic filler are uniformly dispersed in a waxy substance, and a method of modifying only a surface portion of the vulcanized rubber with such a composition without a polar solvent.

(2) Description of the Prior Art

As an adhesion technique for vulcanized rubber, there has hitherto been known a method wherein a solution of an unvulcanized rubber dissolved in an organic solvent such as toluene or a so-called rubber cement is applied to the surface of the vulcanized rubber and dried and thereafter an unvulcanized rubber is piled thereon to perform press vulcanization. In this method, however, a mold meeting with the requirements for one-piece molding must be manufactured every the molding and a complicated mechanical equipment for pressurization and heating is required. In addition, rubber to be adhered is limited to the same kind of unvulcanized rubbers as vulcanized rubber.

There is also known another method in which vulcanized rubber is adhered to the other material by using a polychloroprene (CR) in unvulcanized state, an acrylonitrilebutadiene copolymer generally called as nitrile rubber, a graft copolymer rubber produced by graft polymerization of the above rubber with vinyl compound such as methylmethacrylate or the like, or a rubber cement produced by dissolving a blend of the above rubber and phenol resin into an organic solvent. But, satisfactory adhesive force cannot yet be obtained by such a method. There is a still further method of using an air curing rubber cement in which the vulcanization is carried out by using an ultrarapid-accelerator or sulfur chloride. In this method, however, it is extremely difficult to obtain sufficient adhesive force.

As a method of treating a surface of vulcanized rubber, there has hitherto been performed a method in which the surface of the vulcanized rubber is strongly oxidized with a treating agent such as concentrated sulfuric acid, potassium permanganate, potassium dichromate or the like and then washed with water to remove the treating agent, and thereafter the thus treated vulcanized rubber is bent to produce fine cracks onto its whole surface, which is coated with an adhesive and is adhered to the other material. In this case, great care should be taken on the handling of the strong acid or strong oxidizing agent. Moreover, the adhesive force is insufficient and the use of such a strong oxidizing agent unfavorably degrades the vicinity of the vulcanized rubber surface.

In order to eliminate such defects, there has been developed a technique described in Japanese Patent Application Publication No. Sho 52-36,910, that is, a technique of treating the surface of the vulcanized rubber with a solution of a compound containing N,N-dihalosulfonamide group as a halogen-releasable halogenoid, whereby the vulcanized rubber can be adhered to a material of other kinds and the adhesive force is conspicuously improved.

However, this technique has still the following three drawbacks and is not widely applied for the industrial purpose.

(1) Since the organic solvent having a relatively high toxicity such as acetone, tetrahydrofuran is used, the technique cannot be applied to a place having no local ventilation apparatus.

(2) Since the halogen-releasable halogenoid is degrade to lose its effectiveness in a solvent having an active hydrogen in a relatively short time, once a solution of the halogenoid is prepared, it must be used usually in a half day, and within a day at the latest. Further, since the halogenoid dislikes water and degrades with water in air, extremely careful attention must be paid on the reserve of the halogenoid.

(3) Since the halogenoid is used in a form of solution, in surface modifying operation, it penetrates into the interior portion of the vulcanized rubber and modifies the vulcanized rubber to a thickness of about 10–15 $\mu$m as measured from the surface thereof. Such a modification is unfavorable from the standpoint of flex resistance, which reduces the flex resistance of the vulcanized rubber.

As previously mentioned, there are not yet developed satisfactory surface modifying agents for vulcanized rubber and method of modifying the surface of the vulcanized rubber.

SUMMARY OF THE INVENTION

It is, therefore, an object of the invention to eliminate the above mentioned drawbacks of the prior art.

It is another object of the invention to provide a novel surface modifying composition for vulcanized rubber having a halogen-releasable halogenoid and an inorganic filler dispersed in a waxy substance and having an excellent shelf stability without using an active hydrogen containing solvent producing a harmful solvent vapor.

It is a further object of the invention to provide a method of modifying a surface of vulcanized rubber which can modify only a portion of the vulcanized rubber extending from the surface up to a depth of 3 $\mu$m and includes no disadvantages such as reduction of flex resistance and the like.

According to a first aspect of the invention, there is the provision of a non-solvent type surface modifying composition for vulcanized rubber comprising a halogen-releasable halogenoid, a waxy substance with a melting point of not more than 100° C. and an inorganic filler as its main ingredients wherein the amount of the inorganic filler is in a range of 15–80% by weight based on the whole surface modifying composition, and 0.6–20 times in weight that of the halogen-releasable halogenoid. According to a second aspect of the invention, there is provided a method of modifying a surface of vulcanized rubber which comprises applying a non-solvent type surface modifying composition for vulcanized rubber comprising a halogen-releasable halogenoid, a waxy substance with a melting point of not more than 100° C., and an inorganic filler as its main ingredients wherein the amount of the inorganic filler is in a range of 15–80% by weight based on the whole surface modifying composition, and 0.6–20 times in weight that of the halogen-releasable halogenoid to the surface of the vulcanized rubber and then modifying the thus coated surface by heating at 60° C.-150° C.

DETAILED DESCRIPTION OF THE INVENTION

The term "vulcanization" in the vulcanized rubber used herein means the introduction of three-dimensional crosslinked structure between rubber molecules. Thus, the term "vulcanized rubber" used herein means rubbers having the three-dimensional crosslinked structure between rubber molecules. In this case, the introduction of the crosslinked structure may be performed by various crosslinking methods such as usual sulfur vulcanization, thiuram cure, peroxide vulcanization and the like.

The degree of crosslinking can be determined by measuring molecular weight between crosslinked sites (as to the detail, see "Rubber testing method" edited by Japan Rubber Association, page 93, 1963). The vulcanized rubber to be treated according to the invention is vulcanized rubbers having an average molecular weight between crosslinked sites of not more than 25,000, which have hitherto been said to be difficult to be adhered. The preferred range of the average molecular weight between crosslinked sites is from 2,000 to 10,000.

The term "rubber" of the vulcanized rubber used herein means natural rubber and synthetic rubbers. As the synthetic rubber, mention may be made of polyisoprene rubber, polybutadiene rubber, polychloroprene rubber, styrene-butadiene copolymer rubber, isoprene-butadiene copolymer rubber, isobutylene-isoprene copolymer rubber, ethylene-propylene-diene terpolymer rubber, halogenated isobutylene-isoprene copolymer rubber, acrylonitrile-butadiene copolymer rubber and the like. As a matter of course, the rubber includes a blend of natural rubber with one or more of the synthetic rubbers.

Moreover, the vulcanized rubber may optionally be compounded with an inorganic filler such as carbon black, silica, calcium carbonate, titanium dioxide or the like; a softening agent such as mineral oil, vegetable oil, synthetic plasticizer or the like; compounding ingredients usually used for the preparation of the rubber; a pigment and the like in accordance with use purposes.

The term "halogen-releasable halogenoid" used herein means halogenoids capable of easily releasing halogen, which have a chemical stability of being stored under appropriate conditions and easily release halogen upon contact with the vulcanized rubber to modify the vulcanized rubber. Concretely, there are compounds containing N,N-dihalosulfonamide group and other halogen-releasable halogenoids as mentioned later.

As the compound containing N,N-dihalosulfonamide group, there are preferably used compounds having the following general formula:

$$R-SO_2NX_2 \text{ or } R'_m-(Ar)-(SO_2NX_2)_n,$$

wherein

X is a halogen atom,

R and R' represent an aliphatic hydrocarbon residue having a carbon number of 1-6 and further R' may be a hydrogen atom or a halogen atom, Ar is a residue selected from

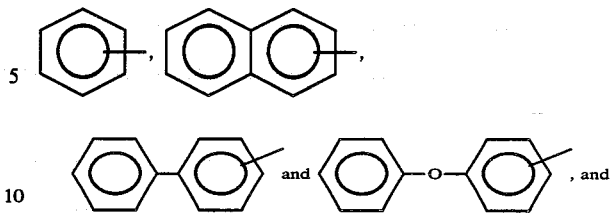

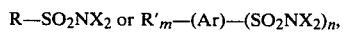

m and n are an integer of 1-3, respectively.

A typical example of the compounds containing one N,N-dihalosulfonamide group includes N,N-dichlorobenzenesulfonamide, N,N-dibromobenzenesulfonamide, N,N-dichloromethylsulfonamide, N,N-dibromomethylsulfonamide, N,N-dichloroethylsulfonamide, N,N-dibromoethylsulfonamide, N,N-dichloropropylsulfonamide, N,N-dibromopropylsulfonamide, N,N-dichlorobutylsulfonamide, N,N-dibromobutylsulfonamide, N,N-dichloropentylsulfonamide, N,N-dibromopentylsulfonamide, N,N-dichlorohexylsulfonamide, N,N-dibromohexylsulfonamide, N,N-dichloro-p-toluenesulfonamide, N,N-dibromo-p-toluenesulfonamide, N,N-dichloro-o-toluenesulfonamide, N,N-dibromo-o-toluenesulfonamide, N,N-dichloro-p-chlorobenzenesulfonamide, N,N-dibromo-p-chlorobenzenesulfonamide, N,N-dichloro-p-bromobenzenesulfonamide, N,N-dibromo-p-bromobenzenesulfonamide, N,N-dichloro-p-iodobenzenesulfonamide, N,N-dibromo-p-iodobenzenesulfonamide, and the like. Furthermore, the compounds containing two N,N-dihalosulfonamide groups include N,N,N',N'-tetrachloro-1,3-benzenedisulfonamide, N,N,N',N'-tetrabromo-1,3-benzene-disulfonamide, N,N,N',N'-tetrabromo-1,5-naphthalenedisulfonamide, N,N,N',N'-tetrachloro-1,5-naphthalenedisulfonamide, N,N,N',N'-tetrachloror-oxy-bis(benzenesulfonamide), N,N,N',N'-tetrabromo-oxy-bis(benzenesulfonamide), N,N,N',N'-tetrachloro-4,4-biphenyldisulfonamide, N,N,N',N'-tetrabromo-4,4-biphenyldisulfonamide and the like. And also, the compounds containing three N,N-dihalosulfonamide groups include N,N,N',N',N'',N''-hexachloro-1,3,5-benzenetrisulfonamide and the like.

In addition to the above compounds, there are employable various types of other halogen-releasable halogenoids, a preferable example of which includes halogenated isocyanate, N-monohaloalkylurethane, N,N-dihaloalkylurethane, halogenated sulfur, sulfenyl halide, halomethyl ether, azido iodide, azido bromide, iodine chloride, iodine bromide, trichloroacetyl iodide, acetyl bromide, iodine nitrate, alkylhypohalide, alkylthionyl chloride, allylthionyl chloride, nitrosyl chloride, nitrosyl bromide, halogenated isocyanuric acid, halogenated methylhydantoin and the like.

As the waxy substance having a melting point of not more than 100° C., use may be made of any substances capable of uniformly dispersing the halogen-releasable halogenoid without decomposition, a preferable example of which includes at least one substance selected from paraffinic hydrocarbons, saturated higher fatty acids, saturated higher alcohols, saturated higher fatty acid esters and saturated higher fatty acid salts.

In order to uniformly disperse the halogen-releasable halogenoid, there is a method of dispersing the halogenoid in form of solution, but according to the invention, the halogenoid is uniformly dispersed in the waxy substance due to the following reasons:

(1) When the halogenoid is dissolved into chloroform, tetrahydrofuran, or acetone, it is degraded by the active hydrogen in the solvent. On the other hand, the halogenoid dispersed in the waxy substance, particularly paraffinic hydrocarbon is well isolated from moisture in air and is good in the long-term shelf stability.

(2) Since no organic solvent is used, the surface modifying composition according to the invention can be utilized without using special local ventilation apparatus.

(3) Since paraffin wax is often compounded into the vulcanized rubber for the purpose of improving the ozone resistance, if the vulcanized rubber is treated with a solution of the halogen-releasable halogenoid, the wax must be preliminarily wiped out from the surface of the vulcanized rubber with a solvent such as n-hexane. On the other hand, according to the present invention, the surface of the vulcanized rubber is treated with the halogenoid dispersed in the paraffinic hydrocarbon, so that the aforementioned wiping treatment can be omitted.

(4) In the conventional method of using the halogen-releasable halogenoid dissolved into a solvent, the vulcanized rubber is modified up to a depth of about 10–15 $\mu$m from the surface thereof, resulting in the reduction in the flex resistance inherent to the vulcanized rubber. On the contrary, according to the invention, after the vulcanized rubber is coated with the halogenoid dispersed in the waxy substance, it is heated at 60°–150° C. to change the waxy substance into a liquid, during which the halogenoid freely diffuses and reacts with the surface of the vulcanize rubber. In this case, since the molecular weight of the waxy substance is higher than that of the usual solvent, the halogenoid hardly penetrates into the inside of the vulcanized rubber under the above mentioned conditions, so that only the surface of the vulcanized rubber is treated. Thus, the flex resistance inherent to the vulcanized rubber is not almost damaged. According to the invention, the thickness of the vulcanized rubber to be modified is up to 3 $\mu$m from the surface thereof, usually about 1–2 $\mu$m.

The reason why the melting point of the waxy substance is limited to not more than 100° C. is based on the fact that when the melting point exceeds 100° C., if the surface and modifying composition is applied to the vulcanized rubber, the application of the composition is difficult and produces an unevenness and the adhesive force is insufficient. However, even when the waxy substance has a melting point of more than 100° C. as a single substance, if it is blended with a softening agent or low molecular weight waxy substance to form a liquid at a temperature of not more than 100° C. as a whole, the effect of the invention can sufficiently be achieved. Therefore, the waxy substance having a melting point of not more than 100° C. according to the invention can be interpreted to a waxy substance capable of changing into liquid at a temperature of not more than 100° C. using any means. The preferable range of the melting point is 50°–80° C.

The reason why the waxy substances containing no carbon-carbon double bond are employed in the invention is based on the fact that the carbon-carbon double bond is attacked by the halogen-releasable halogenoid. However, even when the double bond is present in the waxy substance, if the halogenoid is dispersed into the waxy substance in an amount larger than that consumed by the reaction with the double bond, the modification treatment itself cannot come into problem, but the use of the waxy substance having the double bond is not favorable in view of economical reasons. Further, the reason why the waxy substance is specified in the invention is based on the fact that it is necessary to use a substance capable of directly applying to the surface of the vulcanized rubber. Moreover, in order to improve the applicability of the composition to the surface of the vulcanized rubber, a proper plasticizer, filler, pigment or activating agent may be included in the composition.

According to the invention, the halogen-releasable halogenoid is preferable to be 1.0–70% by weight of the surface modifying composition. When the amount of the halogenoid is less than 1.0% by weight, satisfactory treating effect cannot be obtained, while when the amount of the halogenoid exceeds 70% by weight, it is difficult to apply the composition to the vulcanized rubber and the long-term shelf stability is poor.

The inorganic filler used in this invention may include silicon dioxide, silicon dioxide anhydride, carbon black, calcium carbonate, magnesium carbonate, sepiolite, calcium carbonate treated with a fatty acid [Hakuenka (calcium carbonate made by Shiraishi Kogyo K.K.; trade name)], clay, china clay, sellaite or the like, and is required to be included in an amount of 15–80% by weight based on the whole surface modifying composition. If the inorganic filler is less than 15% by weight, the shelf stability at an elevated temperature (the shelf stability at a temperature not lower than 27°–28° C.) becomes extremely lower. If it exceeds 80% by weight, the coating workability onto the surface of the vulcanized rubber becomes poorer and the surface modifying effect is lowered. Moreover, the reason why the content of the inorganic filler is limited to 0.6–20 times in weight that of the halogen-releasable halogenoid is that when it is less than 0.6 time, it is impossible to fully prevent the aggregation of the halogenoid at the elevated temperature, while if it exceeds 20 times, the halogenoid is absorbed onto the inorganic filler to deteriorate the surface modifying effect.

It is considered that the inorganic filler functions to prevent the below-mentioned problems. In case of the composition mainly comprising the waxy substance and the halogen-releasable halogenoid only, it has the disadvantage that under the storage conditions (not lower than 27°–28° C.) conceivable in summer, the halogen-releasable halogenoid transfers in the waxy substance to be aggregated with one another, thereby deteriorating the uniformity of the surface modification to a large extent. The inorganic filler functions to prevent this aggregation and is therefore an indispensable constituent of the invention. Further, when the inorganic filler is added, the surface modifying composition can be easily and uniformly coated onto the surface of the vulcanized rubber.

The reason that according to the invention, the moisture content of the inorganic filler is preferably not more than 5% is that the halogen-releasable halogenoid is degraded with water as mentioned before. In this invention, the moisture content was determined from the difference obtained by subtracting the weight of a test sample dried at 80° C. for 3 hours in an oven from the original weight.

In order to modify the surface of the vulcanized rubber, the surface modifying composition for vulcanized rubber according to the invention is used as follows. At first, the surface modifying composition is evenly applied to the surface of the vulcanized rubber at a thin thickness. Then, the coated surface is heated at 60°–150° C. by an appropriate means to change the waxy substance into a liquid, whereby the halogen-releasable halogenoid contained in the liquid is reacted with the surface of the rubber. When the unevenness is produced in the application of the composition, the rubber surface is not uniformly modified and consequently there is a fear that adhesion strength becomes ununiform. Particularly, when the surface of the vulcanized rubber is not contaminated with sand or dust prior to the application of the surface modifying composition, it is not required to clean the rubber surface, and also no other special pretreatment is of course necessary.

The reason why the heating temperature of the coated surface is restricted to 60°–150° C. is based on the fact that when the heating temperature is less than 60° C., the waxy substance is not fully converted into a liquid and it is difficult to sufficiently diffuse the halogen-releasable halogenoid up to the surface of the vulcanized rubber and hence the adhesion strength becomes insufficient, while when the heating temperature exceeds 150° C., no sufficient adhesion strength is rather obtained because the halogenoid bonded by reacting with the double bond in the vulcanized rubber is again released from the rubber.

The following examples are given in illustration of the invention and are not intended as limitations thereof.

In the examples, the shape of the vulcanized rubber is simplified as a model experiment for ascertaining adhesion performance, but it is a matter of course that the surface modifying composition according to the invention is applicable to vulcanized rubbers of various shapes such as plate, bar, sphere, fiber and the like. Further, the adhesion performance of the vulcanized rubber are extremely improved by the method according to the invention, so that the thus treated vulcanized rubber has a good adhesion to polyurethane coating material or the like and improve coating properties and printability. Moreover, the invention is most suitable for adhering a light color mark to that portion such as tire side wall or the like which is repeatedly subjected to flexing input.

A vulcanized rubber sheet made of natural rubber (NR), styrene-butadiene copolymer rubber (SBR), cis-polybutadiene rubber (BR) or ethylene-propylene-diene terpolymer rubber (EPDM) was manufactured by vulcanizing a rubber composition of a compounding recipe as shown in the following Table 1 to prepare a slab sheet of 2 mm thick and cutting the sheet into a rectangular strip having a width of 25 mm and a length of 160 mm.

TABLE 1

| Rubber No. | 1 | 2 | 3 | 4 | 5 |
| --- | --- | --- | --- | --- | --- |
| NR | 90 | — | 40 | — | 100 |
| SBR *1 | — | 100 | — | — | — |
| EPDM *2 | — | — | 60 | — | — |
| BR *3 | 10 | — | — | 100 | — |
| HAF *4 | 45 | 50 | 35 | 50 | 45 |
| Aromatic oil | 5 | 5 | — | 10 | — |
| Stearic acid | 2 | 2 | 2 | 2 | 2 |
| Antioxidant *5 | 1 | 1 | 1 | 1 | 1 |
| Paraffin wax | 1 | 1 | 1 | 1 | 1 |
| ZnO | 3 | 3 | 3 | 3 | 3 |
| DPG *6 | — | 0.5 | — | 0.2 | — |
| MBTS *7 | — | 1.2 | — | 0.8 | — |
| OBS *8 | 0.5 | — | 0.5 | — | 0.5 |
| TMTD *9 | — | — | 1.5 | — | — |
| Sulfur | 2.0 | 1.5 | 1.5 | 115 | 20 |
| Vulcanization conditions | temperature time: 145° C. × 30 min, pressure: 50 kg/cm² | | | | |

*1 SBR 1500 (trade name) made by Japan Synthetic Rubber Co., Ltd.
*2 EP35 (trade name) made by Japan Synthetic Rubber Co., Ltd.
*3 BR01 (trade name) made by Japan Synthetic Rubber Co., Ltd.
*4 Carbon black
*5 N—isopropyl-N'—phenyl-p-phenylenediamine
*6 diphenylguanidine (vulcanization accelerator)
*7 dibenzothiazyl disulfide (vulcanization accelerator)
*8 N—oxydiethylene-2-benzothiazyl sulfenamide (Vulcanization accelerator)
*9 tetramethylthiuram disulfide (Vulcanization accelerator)

EXAMPLE 1, COMPARATIVE EXAMPLES 1 AND 2

4 g of N,N-dibromobenzenesulfonamide and 12 g of calcium carbonate of 200 mesh were uniformly mixed with 16 g of paraffin wax having a melting point of 56.5° C. (made by Japan Petroleum Co., Ltd.; trade name: 130° F. Paraffin) at 100° C., which was stirred while gradually being cooled until it became waxy and finally shaped into a bar having a diameter of 1.5 cm and a length of 6 cm to form a surface modifying composition for vulcanized rubber. Then, the resulting composition was applied to two vulcanized rubber sheets of Rubber No. 1 (Table 1) each having a thickness of 2 mm, a width of 25 mm and a length of 160 mm and reinforced at its back side with organic fibers and heated at 100° C. for 10 seconds by means of an iron and thereafter the remaining composition was wiped out from the rubber surface with n-hexane. A thermoplastic polyurethane film of 0.5 mm thick (manufactured by Japan Polyurethane Co., Ltd., trade name: Paraprene DN 4818) was interposed between the two vulcanized rubber sheets, which was pressed at 200° C. for 30 seconds by means of an iron, whereby the two vulcanized rubber sheets were bonded to each other. The resulting sheet was used as a sample for the measurement of adhesion strength in Example 1. Further, a sample for De Mattia tester described in JIS K6301 was prepared from the vulcanized rubber sheet of Rubber No. 1 and the surface thereof was treated with the above surface modifying composition and cleaned in the same manner as described above, which was used as a sample for the measurement of flex fatigue resistance in Example 1.

In Comparative Example 1, 4 g of N,N-dibromobenzenesulfonamide and 16 g of paraffin wax of m.p. 56.5° C. (made by Japan Petroleum Co., Ltd.; trade name: 130° F. Paraffin) were uniformly mixed with each other at 100° C., stirred while being gradually cooled until it becomes a waxy substance, and lastly molded into a rod of 1.5 cm in diameter and 6 cm in length to obtain a surface modifying composition for the vulcanized rubber.

Next, two vulcanized rubber sheets of Rubber No. 1 (Table 1) each having a thickness of 2 mm, a width of 25 mm, and a length of 160 mm and reinforced at its back side with organic fibers were coated with the surface modifying composition thus obtained. After heating with an iron at 100° C. for 10 seconds, the excess surface modifying composition was removed from the rubber surface with n-hexane. Thereafter, the vulcanized rubber sheets thus treated were bonded to each other in the same manner as in Example 1 to prepare a sample for the measurement of the adherence strength. Further, a sample for De Mattia tester as treated in the same manner as mentioned above was taken as a sample for flex fatigue resistance evaluation.

In Comparative Example 2, a 20% actone solution of N,N-dibromobenzenesulfonamide was first prepared. Separately, the surfaces of the two vulcanized rubber sheets of Rubber No. 1 each having a thickness of 2 mm, a width of 25 mm and a length of 160 mm and reinforced at its back side with organic fibers were cleaned with n-hexane and further with acetone. Thereafter, the above 20% acetone solution was applied to the cleaned rubber surfaced with a brush to effect the surface treatment, wherein such an application of the 20% acetone solution was repeated three times after the drying. After the completion of the surface treatment, excess amount of the surface modifying composition was removed with acetone and then the thus treated two vulcanized rubber sheets were bonded to each other in the same manner as described in Example 1 to prepare a sample for the measurement of adhesion strength. Further, a sample for De Mattia tester was prepared, treated with the 20% acetone solution of N,N-dibromobenzenesulfonamide and cleaned with acetone in the same manner as described above to give a sample for the measurement of the flex fatigue resistance in Comparative Example 1.

The surface modifying composition of Example 1 and Comparative Example 1 and the surface-modifying solution of Comparative Example 2 were airtightly stored at room temperature, respectively. After three day storage, one week storage, one month storage, or three month storage, the same treatment as described above was performed to measure the degradation degree of the surface modification performance.

With respect to Example 1 and Comparative Examples 1 and 2, the surface-treated thickness or the degree of surface modification up to what depth (μm) from the rubber surface was measured from a sectional photograph obtained by means of an X-ray microanalyzer (XMA).

In Comparative Example 3, the two vulcanized rubber sheets of Rubber No. 1 were bonded to each other through the same polyurethane film without using any one of the above mentioned surface treatments.

The flex fatigue resistance was evaluated according to JIS K6301 wherein the sample was bent; at 300 cycle/min without forming initial cut and a time until the occurrence of first crack was measured, and represented by the following equation:

$$\frac{\text{time until the occurrence of first crack in each sample}}{\text{time until the occurrence of first crack in the sample of Comparative Example 2}} \times 100$$

That is, the larger the numerical value, the better the flex fatigue resistance as compared with Comparative Example 2.

The thus measured results are shown in the following Table 2.

TABLE 2

|  |  |  | Example 1 | Comparative Example 1 | Comparative Example 2 | Comparative Example 3 |
|---|---|---|---|---|---|---|
| Surface-treated thickness (μm) |  |  | 1.8 | 1.8 | 12.6 | not treated |
| Flex fatigue resistance |  |  | 556 | 553 | 100 | 548 |
| Adhesion strength (kg/25 mm) | Left at room temperature (23° C.) | immediately after preparation | *≧60 | *≧60 | *≧60 | **0.8 |
|  |  | after 3 days | *≧60 | *≧60 | 2.9 | — |
|  |  | after 1 week | *≧60 | *≧60 | 1.5 | — |
|  |  | after 30 days | *≧60 | *≧60 | 0.8 | — |
|  |  | after 3 months | *≧60 | *≧60 | — | — |
|  | Left at 30° C.) | immediately after preparation | *≧60 | *≧60 | *≧60 | — |
|  |  | after 3 days | *≧60 | 45 | 0.8 | — |
|  |  | after 1 week | *≧60 | 21 | 0.8 | — |
|  |  | after 30 days | *≧60 | 1.1 | 0.8 | — |
|  |  | after 3 months | *≧60 | 0.8 | — | — |

*coherent fracture of rubber (no peeling at adhesion boundary)
**adhesion strength in untreated case The composition of the surface modifying composition in Example 1 is:

| N,N—dibromobenzenesulfonamide | 4 g | 12.5% by weight |
|---|---|---|
| Calcium carbonate | 12 g | 37.5% by weight |
| Paraffin | 16 g | 50% by weight |

The weight of calcium carbonate is 3 times that of the halogenoid.

EXAMPLES 2, 3 AND COMPARATIVE EXAMPLES 4–7

As seen from the following Table 3, in Examples 2 and 3, and Comparative Examples 4–7, the weight of the inorganic filler was limited to 15–80% by weight based on the whole surface modifying composition, and 0.6–20 times that of the halogen-releasable halogenoid.

The preparation of the test samples was made in the same manner as in Example 1, the results being shown in Table 3.

TABLE 3

|  | Comparative Example 4 | Example 2 | Comparative Example 5 | Example 3 | Comparative Example 6 | Comparative Example 7 |
|---|---|---|---|---|---|---|
| N,N—dibromobenzenesulfonamide (g) | 4 | 8 | 12 | 2.5 | 1.5 | 5 |
| 130° F. Paraffin (g) | 20 | 20 | 20 | 10 | 10 | 10 |
| Calcium carbonate (g) | 3.6 | 5.73 | 6.55 | 37.5 | 34.2 | 65 |
| Halogenoid (wt %) based on the whole surface modifying composition | 14.5 | 23.8 | 31.1 | 5 | 3.3 | 6.3 |

TABLE 3-continued

|  | Comparative Example 4 | Example 2 | Comparative Example 5 | Example 3 | Comparative Example 6 | Comparative Example 7 |
|---|---|---|---|---|---|---|
| Inorganic filler (wt %) based on the whole surface modifying composition | 13 | 17 | 17 | 75 | 75 | 81.3 |
| Inorganic filler/halogenoid (weight ratio) | 0.9 | 0.72 | 0.54 | 15 | 22.8 | 13 |
| Adhesion strength (kg/25 mm) Left at 30° C. — Immediately after preparation | *≧60 | *≧60 | *≧60 | 55.2 | 12.1 | — |
| After 3 days | *≧60 | *≧60 | *≧60 | 55.2 | 12.2 | — |
| After 1 week | 46.5 | *≧60 | 37.5 | 54.5 | 11.5 | — |
| After 30 days | 32.4 | *≧60 | 15.4 | 54.5 | 11.2 | — |
| After 3 months | 18.9 | 55 | 5.4 | 54.5 | 11.0 | — |
| Remarks |  |  |  |  |  | couldn't be molded in a rod shape |

*Coherent fracture of rubber (no peeling at adhesion boundary)

EXAMPLES 4 AND 5, COMPARATIVE EXAMPLES 8 AND 9

In Examples 4 and 5 and Comparative Examples 8 and 9, the concentration of the halogen-releasable halogenoid was varied in the surface modifying composition, which shows that the concentration of the halogenoid is preferable to be within a range of 1.0–70% by weight of the surface modifying composition.

In these examples, there were used the vulcanized rubber sheet of Rubber No. 2 (Table 1), N,N-dichlorobenzenesulfonamide as a halogen-releasable halogenoid, paraffin wax having a melting point 54.1° C. (made by Japan Petroleum Co., Ltd.; trade name: Paraffin wax M) as a waxy substance, calcium carbonate of 200 mesh as a filler, and a thermoplastic polyester film (made by Du Pont de Nemours, trade name: Hytrel S type) having a thickness of 0.1 mm as an adhesive, respectively. Except for the variation of the halogenoid concentration, the preparation of the surface modifying composition and the modifying and bonding treatments immediately after the composition preparation were carried out in the same manner as described in Example 1 to prepare a sample for the measurement of adhesion strength. Moreover, Comparative Example 9 is the case of using the vulcanized rubber sheet without surface modification likewise Comparative Example 3. The results are shown in the following Table 4.

TABLE 4

|  | Comparative Example 8 | Example 4 | Example 5 | Comparative Example 9 |
|---|---|---|---|---|
| N,N—dichlorobenzene-sulfonamide (g) | 0.25 | 0.92 | 26 |  |
| Calcium carbonate (g) | 5.0 | 15 | 16 |  |
| Paraffin wax M (g) | 30 | 30 | 10 |  |
| N,N—dichlorobenzene-sulfonamide (wt %) based on the whole surface modifying composition | 0.8 | 2.0 | 50 | not treated |
| Calcium carbonate (wt %) based on the whole surface modifying composition | 14.2 | 32.7 | 30.7 |  |
| Calcium carbonate/halogenoid (weight ratio) | 20 | 16.3 | 0.62 |  |
| Adhesion strength (kg/25 mm) | 9 | 47 | *≧60 | 0.8 |

*Coherent fracture of rubber (no peeling at adhesion boundary)

EXAMPLES 6–14

In Examples 6–14, the rubber of Rubber No. 4 in Table 1 was used as a vulcanized rubber sheet, while the following was used as the surface modifying composition:

| | |
|---|---|
| N,N—dibromotoluenesulfonamide | 11.25 g (20% by weight) |
| Waxy substance | 30 g (53.3% by weight) |
| Calcium carbonate | 15 g (26.7% by weight) |
| Calcium carbonate/halogenoid (weight ratio) 1.33 | |

As the waxy substance, six kinds of paraffin waxes having melting points of from 48° C. to 83.6° C. (made by Japan Petroleum Co., Ltd.: trade name: Paraffin wax) were used in Examples 6–11, while stearic acid having a melting point of 65.5° C. was used in Example 12, palmitic acid having a melting point of 61.0° C. in Example 13, pentadecanol having a melting point of 60.0° C. in Example 14. As the adhesive, a thermoplastic polyurethane (made by Japan Polyurethane Co., Ltd.; trade name Paraprene 26-S) was used. The preparation of the surface modifying composition, the surface modifying and bonding treatments immediately after the composition preparation and the measurement of adhesion strength were carried out in the same manner as described in Example 1. The results are shown in the following Table 5.

TABLE 5

| Example | Waxy substance | Melting point (°C.) | Adhesion strength (kg/25 mm) | Remarks |
|---|---|---|---|---|
| 6 | paraffin wax | 48 | 44.2 | too soft and application is difficult |
| 7 |  | 53.8 | 41.8 | no problem |
| 8 |  | 61.9 | 43.4 | no problem |
| 9 |  | 70.0 | 41.8 | no problem |
| 10 |  | 76.0 | 42.4 | no problem |
| 11 |  | 83.6 | 35.6 | uneven application was caused |

TABLE 5-continued

| Example | Waxy substance | Melting point (°C.) | Adhesion strength (kg/25 mm) | Remarks |
|---|---|---|---|---|
| 12 | stearic acid | 65.5 | 42.2 | somewhat no problem |
| 13 | palmitic acid | 61.0 | 43.6 | no problem |
| 14 | pentadecanol | 60.0 | 44.5 | no problem |

It can be seen from Table 5 that the melting point of the waxy substance is preferably 50°–80° C.

EXAMPLES 15–17, COMPARATIVE EXAMPLE 10

In Examples 15–17, the following was used as the surface modifying composition:

| | | |
|---|---|---|
| Halogen-releasable halogenoid | 5 g | (10% by weight) |
| Waxy substance (130° F. paraffin) | 30 g | (60% by weight) |
| Calcium carbonate (200 mesh) | 15 g | (30% by weight) |
| [Calcium carbonate/halogenoid (weight ratio) 3] | | |

The same procedure as described in Example 1 was repeated except that isocyanate iodide, N,N-dibromopropylurethane or t-butylhypobromide was used in an amount of 10% by weight as a halogen-releasable halogenoid Comparative Example 10 is the case of performing no surface treatment likewise Comparative Example 3. The results are shown in the following Table 6.

TABLE 6

| | Example 15 | Example 16 | Example 17 | Comparative Example 10 |
|---|---|---|---|---|
| Halogen-releasable halogenoid | isocyanate iodide | N,N—dibromopropylurethane | t-butyl-hypobromide | — |
| Halogenoid concentration (wt %) | 10 | 10 | 10 | 0 |
| Adhesion strength (kg/25 mm) | 38 | 39 | 32 | 0.2 |

EXAMPLES 18–27

Test samples were prepared and tested in the same manner as described in Example 1 except that the surface modifying compositions in the following Table 7 were used. As the inorganic filler, the following were used:

(A) silicon dioxide (made by Japan Silica Kogyo K.K.; trade name: Nipsil VN-3)

(B) the inorganic filler (A) dried at 80° C. for 0.5 hour (C) the inorganic filler (C) dried at 80° C. for 1.5 hours Aerosil #200 (made by Japan Aerosil Co., Ltd.; trade name) titanium oxide (rutile type)

Hakuenka CC (calcium carbonate made by Shiraishi Kogyo K.K.; trade name)

Sepiolite (made by Takeda Seiyaku Kogyo K.K.; trade name: Adeplus)

Hard Clay (made by Shiraishi Kogyo K.K.; trade name: Crown Clay) Carbon Black HAF, SAF (made by Mitsubishi Kasei K.K.).

The results are shown in Table 7.

TABLE 7(a)

| | Example 18 | Example 19 | Example 20 | Example 21 | Example 22 |
|---|---|---|---|---|---|
| N,N—dichlorobenzenesulfonamide (g) | 12 | 12 | 12 | 12 | 12 |
| Nipsil VN-3 (A) (g) | 15 | — | — | — | — |
| Nipsil VN-3 (B) (g) | — | 15 | — | — | — |
| Nipsil VN-3 (C) (g) | — | — | 15 | — | — |
| Aerosil #200 (g) | — | — | — | 15 | — |
| TiO (rutil) (g) | — | — | — | — | 15 |
| Hakuenka CC (g) | — | — | — | — | — |
| Adeplus P (g) | — | — | — | — | — |
| Crown Clay (g) | — | — | — | — | — |
| HAF (g) | — | — | — | — | — |
| SAF (g) | — | — | — | — | — |
| 130° F. Paraffin (g) | 30 | 30 | 30 | 30 | 30 |
| Halogenoid (wt %) based on the whole surface modifying composition | 23 | 23 | 23 | 23 | 23 |
| Inorganic filler (wt %) based on the whole surface modifying composition | 28.8 | 28.8 | 28.8 | 28.8 | 28.8 |
| Inorganic filler/halogenoid (weight ratio) | 1.25 | 1.25 | 1.25 | 1.25 | 1.25 |
| Moisture content in inorganic filler (%) | 8.2 | 4.8 | 3.6 | 0 | 0.8 |
| Adhesion strength (kg/25 mm) Left at 30° C. Immediately after preparation | *≧60 | *≧60 | *≧60 | *≧60 | *≧60 |
| After 3 days | " | " | " | " | " |
| After 1 week | " | " | " | " | " |
| After 30 days | 55 | 58 | " | " | " |
| After 3 months | 49 | 54 | " | " | " |

TABLE 7(b)

| | Example 23 | Example 24 | Example 25 | Example 26 | Example 27 |
|---|---|---|---|---|---|
| N,N—dichlorobenzenesulfonamide (g) | 12 | 12 | 12 | 12 | 12 |
| Nipsil VN-3 (A) (g) | — | — | — | — | — |
| Nipsil VN-3 (B) (g) | — | — | — | — | — |
| Nipsil VN-3 (C) (g) | — | — | — | — | — |
| Aerosil #200 (g) | — | — | — | — | — |
| TiO (rutil) (g) | — | — | — | — | — |
| Hakuenka CC (g) | 15 | — | — | — | — |
| Adeplus P (g) | — | 15 | — | — | — |

TABLE 7(b)-continued

|  | Example 23 | Example 24 | Example 25 | Example 26 | Example 27 |
|---|---|---|---|---|---|
| Crown Clay (g) | — | — | 15 | — | — |
| HAF (g) | — | — | — | 15 | — |
| SAF (g) | — | — | — | — | 15 |
| 130° F. Paraffin (g) | 30 | 30 | 30 | 30 | 30 |
| Halogenoid (wt %) based on the whole surface modifying composition | 23 | 23 | 23 | 23 | 23 |
| Inorganic filler (wt %) based on the whole surface modifying composition | 28.8 | 28.8 | 28.8 | 28.8 | 28.8 |
| Inorganic filler/halogenoid (weight ratio) | 1.25 | 1.25 | 1.25 | 1.25 | 1.25 |
| Moisture content in inorganic filler (%) | 0.5 | 3.6 | 2.5 | 0.8 | 0.8 |
| Adhesion strength (kg/25 mm) Left at 30° C. | Immediately after preparation | *≧60 | *≧60 | *≧60 | *≧60 | *≧60 |
|  | After 3 days | " | " | " | " | " |
|  | After 1 week | " | " | " | " | " |
|  | After 30 days | " | " | " | " | " |
|  | After 3 months | " | " | " | " | " |

EXAMPLES 28–30, COMPARATIVE EXAMPLES 11 AND 12

The same procedure as described in Example 1 was repeated except that the rubber of Rubber No. 5 in Table 1 was used as the vulcanized rubber sheet, the surface modifying composition in Table 1 was used, and the heating temperature of the rubber surface coated with the surface modifying composition was changed to 55°–155° C. The results are shown in the following Table 8.

TABLE 8

|  | Comparative Example 11 | Example 28 | Example 29 | Example 30 | Comparative Example 12 |
|---|---|---|---|---|---|
| Heating temperature (°C.) | 55 | 65 | 120 | 140 | 155 |
| Adhesion strength (kg/25 mm) | 19.1 | *≧60 | *≧60 | *≧60 | 7.2 |

*Coherent fracture of rubber (no peeling at adhesion boundary)

It can be seen from Table 8 that the heating temperature is required to be 60°–150° C.

As mentioned above, the invention provides a non-solvent type surface modifying composition for vulcanized rubber, in which the halogen-releasable halogenoid and the inorganic filler are uniformly dispersed in the waxy substance having a melting point of not more than 100° C., and a method of modifying the surface of the vulcanized rubber by using such a surface modifying composition. According to the invention, the surface modifying composition has an excellent shelf stability, particularily, the shelf stability at an elevated temperature in summer, etc., and produces no harmful solvent vapor in use, so that the use of local ventilation apparatus is not required and also the surface of the vulcanized rubber is not particularly required to be cleaned prior to the application of the composition. Further, the surface modifying composition modifies the surface of the vulcanized rubber to give a strong adhesive force and also the degree of surface modification is restricted to only a thin portion of the rubber surface, which has no bad influence on the properties of the vulcanized rubber such as flex fatigue resistance and the like.

What is claimed is:

1. A surface modifying composition for vulcanized rubber comprising a halogen-releasable halogenoid, a waxy substance having a melting point of not more than 100° C., and an inorganic filler, and being non-solvent type, wherein the weight of the inorganic filler is in a range of 15–80% based on the whole surface modifying composition, and 0.6–20 times that of the halogen-releasable halogenoid, said halogen-releasable halogenoid is a compound containing N,N-dihalosulfonamide group and represented by the following general formula:

R—SO$_2$NX$_2$ or R′$_m$—(Ar)—(SO$_2$NX$_2$)$_n$, wherein X is a halogen atom, R and R′ represent an aliphatic hydrocarbon residue having a carbon number of 1–6 and further R′ may be a hydrogen atom or a halogen atom, Ar is a residue selected from

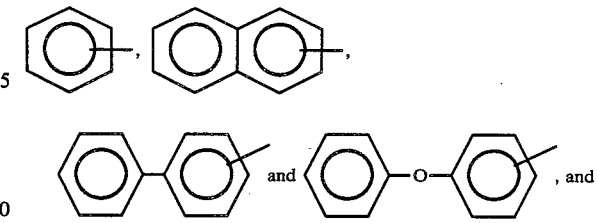

m and n are an integer of 1–3, respectively.

2. A surface modifying composition for vulcanized rubber comprising a halogen-releasable halogenoid, a waxy substance having a melting point of not more than 100° C., and an inorganic filler, and being non-solvent type, wherein the weight of the inorganic filler is in a range of 15–80% based on the whole surface modifying composition, and 0.6–20 times that of the halogen-releasable halogenoid, wherein said halogen-releasable halogenoid is a compound selected from the group consisting of halogenated isocyanate, N-monohaloalkylurethane, N,N-dihaloalkylurethane, halogenated sulfur, sulfenyl halide, halomethyl ether, azido iodide, azido bromide, iodine chloride, iodine bromide, trichloroacetyl iodide, acetyl bromide, iodine nitrate, alkylhypohalide, alkylthionyl chloride, allylthionyl chloride, nitrosyl chloride, nitrosyl bromide, halogenated isocyanuric acid and halogenated methylhydantoin.

3. A surface modifying composition according to claim 1, wherein said halogen-releasable halogenoid is a compound selected from the group consisting of halogenated isocyanate, N-monohaloalkylurethane, N,N-dihaloalkylurethane, halogenated sulfur, sulfenyl halide, halomethyl ether, azido iodide, azido bromide, iodine chloride, iodine bromide, trichloroacetyl iodide, acetyl bromide, iodine nitrate, alkylhypohalide, alkylthionyl chloride, allylthionyl chloride, nitrosyl chloride, nitrosyl bromide, halogenated isocyanuric acid and halogenated methylhydantoin.

4. A surface modifying composition according to claim 1, wherein said waxy substance is at least one substance selected from the group consisting of paraffinic hydrocarbons, saturated higher fatty acids, saturated higher alcohols, saturated higher fatty acid esters and saturated higher fatty acid salts.

5. A surface modifying composition according to claim 1, wherein said halogen-releasable halogenoid is used in an amount of 1.0–70% by weight of said composition.

6. A surface modifying composition according to claim 1, wherein said inorganic filler is one selected from the group consisting of silicon dioxide, silicon dioxide anhydride, carbon black, calcium carbonate, magnesium carbonate, sepiolite, calcium carbonate treated with a fatty acid, clay, china white, and shellate.

7. A surface modifying composition according to claim 1, wherein the moisture content of the inorganic filler is not more than 5%.

8. A method of modifying a surface of vulcanized rubber, comprising the steps of: applying a surface modifying composition for vulcanized rubber, which composition comprises a halogen-releasable halogenoid, a waxy substance having melting point of not more than 100° C. and an inorganic filler, and is non-solvent type, wherein the weight of the inorganic filler is in a range of 15–80% based on the whole surface modifying composition, and 0.6–20 times that of the halogen-releasable halogenoid, to the surface of the vulcanized rubber; and then modifying the thus coated surface by heating at 60°–150° C.

9. The method according to claim 8, wherein said halogen-releasable halogenoid is a compound containing N,N-dihalosulfonamide group and represented by the following general formula:

$$R-SO_2NX_2 \text{ or } R'_m-(Ar)-(SO_2NX_2)_n,$$

wherein X is a halogen atom, R and R' represent an aliphatic hydrocarbon residue having a carbon number of 1–6 and further R' may be a hydrogen atom or a halogen atom, Ar is a residue selected from

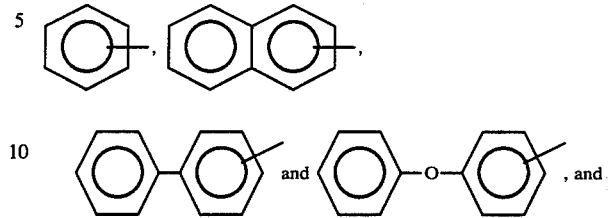

m and n are an integer of 1–3, respectively.

10. The method according to claim 8, wherein said halogen-releasable halogenoid is a compound selected from the group consisting of halogenated isocyanate, N-monohaloalkylurethane, N,N-dihaloalkylurethane, halogenated sulfur, sulfenyl halide, halomethyl ether, azido iodide, azido bromide, iodine chloride, iodine bromide, trichloroacetyl iodide, acetyl bromide, iodine nitrate, alkylhypohalide, alkylthionyl chloride, allylthionyl chloride, nitrosyl chloride, nitrosyl bromide, halogenated isocyanuric acid and halogenated methylhydantoin.

11. The method according to claim 8, wherein said waxy substance is at least one substance selected from the group consisting of paraffinic hydrocarbons, saturated higher fatty acids, saturated higher alcohols, saturated higher fatty acid esters and saturated higher fatty acid salts.

12. The method according to claim 8, wherein said halogen-releasable halogenoid is used in an amount of 1.0–70% by weight of said composition.

13. A method according to claim 8, wherein said inorganic filler is one selected from the group consisting of silicon dioxide, silicon dioxide anhydride, carbon black, calcium carbonate, magnesium carbonate, sepiolite, calcium carbonate treated with a fatty acid, clay, china white, and sellate.

14. A method according to claim 8, wherein the moisture content of the inorganic filler is not more than 5%.

* * * * *